United States Patent Office 3,544,557
Patented Dec. 1, 1970

3,544,557
BENZHYDRYL ETHERS
Wijbe T. Nauta, Nieuw Loosdrecht, Netherlands, assignor to N.V. Koninklijke Pharmaceutische Fabrieken v/h Brocades-Stheeman & Pharmacia, Amsterdam, Netherlands
No Drawing. Filed Aug. 4, 1967, Ser. No. 658,355
Claims priority, application Great Britain, Aug. 9, 1966, 35,658/66
Int. Cl. C07d 41/08
U.S. Cl. 260—239                     6 Claims

ABSTRACT OF THE DISCLOSURE

This invention relates to benzhydryl ethers which can be utilized as local anesthetics, spasmolytics, anticonvulsants, sedatives, blood vessel dilators, or anti-Parkinson agents. The compounds of this invention have the formula

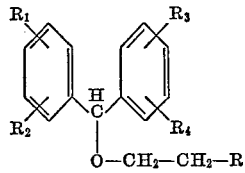

wherein R, $R_1$, $R_2$, $R_3$ and $R_4$ are as defined herein.

---

This invention relates to new therapeutically useful basic benzhydryl ethers and acid-addition and quaternary ammonium salts thereof, to processes for their preparation and to pharmaceutical compositions containing them.

The new benzhydryl ethers of the invention are those of the general formula

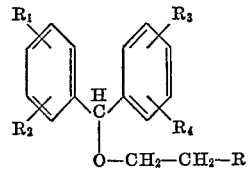                                  I wherein $R_1$, $R_2$, $R_3$ and $R_4$ are the same or different and each represents a hydrogen atom or a lower alkyl group, and R represents a saturated monocyclic or bicyclic nitrogen-containing group having at least seven ring atoms, for example, hexahydroazepine and 3-azabicyclo[3,2,2]nonane, attached through the nitrogen atom to the ethylene radical, and acid-addition and quaternary ammonium salts thereof. Preferred compounds are those having an ortho lower alkyl group attached to one of the phenyl nuclei and salts thereof. Specifically preferred are 3-[2-[(2 - methylbenzhydryl)oxy] - ethyl]3 - azabicyclo[3,2,2] nonane and its salts, which have sedative properties and 1-[2-[2-methylbenzhydryl)oxy]ethyl] - hexahydroazepine and 1 - [2 - [(2 - tert.-butylbenzhydryl)oxy]ethyl]-hexahydroazepine and their salts, which are anti-Parkinson agents. By the term "lower alkyl" as used in this specification is meant straight or branched chain alkyl groups having from one to about six carbon atoms.

The benzhydryl ethers of Formula I have valuable therapeutic properties: they have local anesthetic, spasmolytic, anticonvulsive, sedative, blood vessel dilating, or analgesic properties: some of them have anti-Parkinson activity. They can be administered orally to patients, both animal and human, in daily dosages of 0.5–10 mg./kg. When used as a sedative, a suitable dose for an adult human being is 25 to 100 mg. three times a day. In the treatment of Parkinson's disease, a suitable dose for adults is 12.5 to 50 mg. three times a day. Solutions of 0.1–2% (w./v.) may be used for local anesthetic purposes.

For use as therapeutics, the compounds of Formula I may be used as bases or as acid-addition salts containing pharmaceutically acceptable nontoxic anions, e.g., the hydrohalides, sulphates, oxalates, tartrates, fumarates, acetates, citrates, maleates, succinates, lactates and pamoates. They may also be used in the form of quaternary ammonium salts obtained by reaction with organic halides, e.g., methyl iodide, or other reactive esters.

According to a feature of the invention, the compounds of Formula I are prepared by reacting a benzhydrol of the general formula:

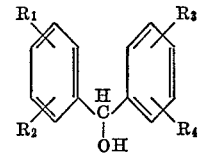
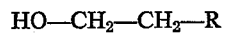                                  II with a 2-substituted ethanol of the formula:

$$HO—CH_2—CH_2—R \qquad III$$

wherein $R_1$, $R_2$, $R_3$, $R_4$ and R have the meanings hereinbefore defined. The reaction is preferably carried out in the presence of a condensing agent such as toluene-p-sulphonic acid.

In another method of preparing the new compounds, a benzhydrol of Formula II is first reacted with a 1,2-dihaloethane of the Formula X—$CH_2$—$CH_2$—X, or 2-haloethanol of the formula HO—$CH_2$—$CH_2$—X, wherein X is a halogen atom, preferably chlorine, and the resulting compound of the formula:

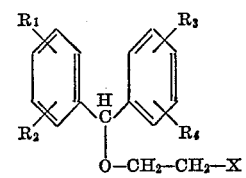                                  IV is reacted with a compound of the formula H—R (wherein the various symbols are as hereinbefore defined), the hydrogen atom being attached to nitrogen. The reactions are carried out in manner known per se for reactions of the same general type. It is preferable when a 1,2-dihaloethane is employed as reactant to add the benzhydrol of Formula II, which may be dissolved in an inert organic solvent, to an excess of the 1,2-dihaloethane so as to prevent the formation of appreciable quantities of a product containing two benzhydryl groups by reaction of both halogen atoms of the dihalide with a hydroxyl group of a benzhydrol molecule of Formula II.

According to another feature of the invention, the compounds of Formula I are prepared by reacting a benzhydrol derivative of the formula:

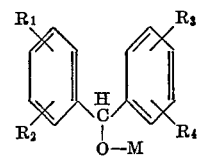
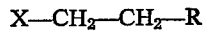                                  V with an ethyl halide of the formula:

$$X—CH_2—CH_2—R \qquad VI$$

wherein M represents an alkali metal atom, preferably sodium, and the other symbols are as hereinbefore defined. The reaction is preferably carried out by heating the reactants in an inert organic solvent, such as an aromatic hydrocarbon, for example, benzene, toluene or xylene.

In still another method, the new compounds of the invention are prepared by reduction of the carbonyl group of an acetamide derivative of the formula:

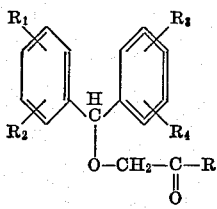

wherein the various symbols are as hereinbefore defined to methylene (i.e., —CH$_2$—) by methods known per se, for reducing a carbonyl groups in an amide to —CH$_2$—, for example, with lithium aluminum hydride or diborane. The reduction is preferably carried out in an inert organic solvent such as diethyl ether or tetrahydrofuran.

By the term "methods known per se" as used in this specification is meant methods heretofore used as described in the chemical literature. The starting materials of Formula III can be obtained by reaction of the compound H—R with a 2-haloethanol of the formula

wherein X represents a halogen atom preferably chlorine or bromine, or with ethylene oxide. The compounds of Formula III can be converted into the starting products of Formula VI by methods known per se, for example, by reaction with thionyl chloride.

The starting materials of Formula VII can be obtained by the following methods:

(a) Reaction of a benzhydrol derivative of the Formula II or V with an acetamide derivative of the formula:

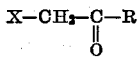

wherein R and X are as hereinbefore defined. The reaction may be carried out in an inert organic solvent medium, e.g., diethyl ether or tetrahydrofuran, and preferably in the presence of an acid-binding agent such as an alkali metal amide or hydride, when a hydrogen halide is formed.

(b) Reaction of an acetic acid derivative of the formula:

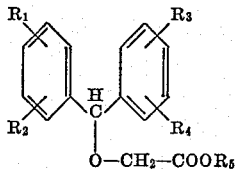

with a compound of the Formula H—R, wherein R$_5$ is a lower alkyl group and the other symbols are as hereinbefore defined. The reaction is preferably carried out in the presence of an inert organic solvent such as benzene, toluene, dimethylsulphoxide or tetrahydrofuran.

The following examples illustrate the invention. All temperatures are in degrees centigrade unless otherwise stated:

EXAMPLE 1

A mixture of 33 g. (0.33 mol.) of hexahydroazepine, 82 g. (0.33 mol.) of 2-(diphenylmethoxy)ethyl chloride, 32 g. (0.5 mol.) of sodium bicarbonate, 300 ml. of benzene and 200 ml. of ethanol is boiled under reflux for ninety hours. After cooling, the mixture is filtered under suction and the solid extracted once more with ethanol. The filtrate and the extract are combined and, after addition of norit and 20 g. of sodium hydroxide, submitted to steam distillation. The distillation is continued until the distillate no longer changes the color of red litmus paper. After cooling and filtration, the residue is extracted with diethyl ether and the extract is dried with sodium sulphate. Upon addition of a solution of hydrogen chloride in diethyl ether, there is obtained the hydrochloride of 1[2-(diphenylmethoxy)ethyl]-hexahydroazepine. Its melting point after crystallization from a mixture of diethyl ether and ethanol is 143–144.5° C.; yield 40%.

*Analysis.*—Calc'd for C$_{21}$H$_{28}$NOCl (percent): C, 72.9; H, 8.10; N, 4.05. Found (percent): C, 73.0; H, 8.2; N, 4.1.

EXAMPLE 2

Following the general procedure described in Example 1, but substituting 2-methylbenzhydryloxy ethyl, 4-methylbenzhydryloxy ethyl, 2-tert-butylbenzhydryloxy ethyl and 2,2',6,6'-tetramethylbenzhydryl chlorides for 2-(diphenylmethoxy)ethyl chloride, the product formed is 1-[2-[(2-methylbenzhydryloxy]ethyl] - hexahydroazepine; 1 - 2-[(4 - methylbenzhydryl)oxy]ethyl]hexahydroazepine; 1-[2-[(2-tert - butylbenzhydryl)oxy[ethyl]hexahydroazepine; and 1-[2-[(2,2',6,6'-tetramethylbenzhydryl)oxy]ethyl]hexahydroazepine hydrochlorides, respectively. These compounds have the formula set forth below and were obtained in the yield indicated:

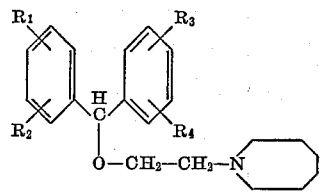

EXAMPLE 3

A mixture of 36.8 g. (0.2 mol.) of benzhydrol, 37.2 g. (0.22 mol.) of N-(2-hydroxyethyl)hexahydroazepine and 41.3 g. (0.24 mol.) of toluene-p-sulphonic acid is heated at 180° C. in vacuo for five hours. After cooling a concentrated solution of sodium hydroxide is added and the mixture is extracted with diethyl ether. The ethereal solution is dried and a solution of hydrogen chloride in diethyl ether is added. There is obtained the hydrochloride of 1-[2-(diphenylmethoxy)ethyl]hexahydroazepine. Its melting point after crystallization from acetone is 140–142° C.; yield 45%.

| R$_1$ | R$_2$ | R$_3$ | R$_4$ | Melting point, ° C. | Yield, percent |
|---|---|---|---|---|---|
| H | H | ortho-CH$_3$ | H | 144–147 | 45 |
| H | H | para-CH$_3$ | H | 130–132 | 36 |
| ortho-CH$_3$ | ortho-CH$_3$ | ortho-CH$_3$ | ortho-CH$_3$ | 202–204 | 47 |
| H | H | ortho-t.-butyl | | 147.5–150.5 | 55 |

EXAMPLE 4

To a solution of 36.8 g. (0.2 mol.) of benzhydrol in 240 ml. of anhydrous toluene is added a solution of 4.6 g. (0.2 at.) sodium in 20 ml. of methanol. The mixture is heated to a temperature of 70–80° C., whereupon azeotropical distillation of methanol starts. After removal of the methanol, the sodium methylate solution is cooled to 30° C., and then with stirring a solution of 41.3 g. (0.22 mol.) of N-(2-chloroethyl)-3-azabicyclo[3,2,2]-nonane in 200 ml. of toluene is added. The mixture is boiled under reflux for eighteen hours. After cooling, the mixture is washed with water and dried with potassium carbonate. Upon addition of an anhydrous solution of hydrogen chloride in diethyl ether, there is obtained the hydrochloride of 3-[2-(diphenylmethoxy)ethyl]-3-azabicyclo-[3,2,2]nonane. Its melting point after crystallization from anhydrous ethanol is 198.5–199.5° C., yield 40%.

*Analysis.*—Calc'd for $C_{23}H_{30}NOCl$ (percent): C, 74.29; H, 8.08; N, 3.77. Found (percent): C, 74.0; H, 8.1; N, 3.6.

EXAMPLE 5

Following the general procedure described in Example 4, but substituting different appropriately substituted benzhydrols for the benzhydrol, 3-[2-(benzhydryloxy)ethyl]-3-azabicyclo[3,2,2]nonanes of the formula shown below are obtained in the form of their hydrochlorides:

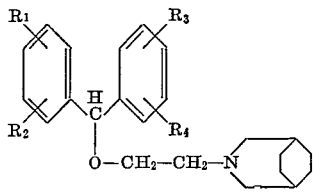

| $R_1$ | $R_2$ | $R_3$ | $R_4$ | Melting point, ° C. | Yield, percent |
|---|---|---|---|---|---|
| H | H | ortho-$CH_3$ | H | 178–180 | 55 |
| H | H | para-$CH_3$ | H | 188.5–190.5 | 44 |
| ortho-$CH_3$ | ortho-$CH_3$ | ortho-$CH_3$ | ortho-$CH_3$ | [1] 207–208 | 48 |
| H | H | ortho-t.-butyl | H | 175.5–177.5 | 50 |

[1] Dissolved.

The compounds formed have the names: 3-[2-[(2-methylbenzhydryl)oxy]ethyl] - 3 - azabicyclo[3,2,2]nonane; 3-[2-[(4-methylbenzhydryl)oxy]ethyl] - 3 - azabicyclo[3,2,2]nonane; 3 - [2[2-tert-butylbenzhydryl)oxy]ethyl]-3-azabicyclo[3,2,2]nonane; and 3-[2-[(2,2',6,6'-tetramethylbenzhydryl)oxy]ethyl] - 3 - azabicyclo[3,2,2] nonane.

EXAMPLE 6

Coated tablets containing 50 mg. of 3-[2-[(2-methylbenzhydryl)oxy]ethyl]-3-azabicyclo[3,2,2]nonane hydrochloride are prepared as follows:

Ingredients: Kilograms
3 - [2 - [(2-methylbenzhydryl)oxy]ethyl]-3-azabicyclo[3,2,2]nonane hydrochloride _____ 20
Sugar (sucrose) _____ 8
Milk sugar _____ 8
Starch _____ 8
Talc _____ 4
Stearic acid _____ 2

The above specified quantities of the active substance, sugar, milksugar, starch and talc are mixed in a conventional mixer and run through a tabletting machine to make as large and dense a tablet as possible. The tablets are reduced to granules of a size of about 25-mesh in an oscillating granulator or dry mill. The granules are thoroughly mixed with the stearic acid and compressed into tablets weighing 125 mg. The tablets are then transferred into a coating pan and there coated in the usual manner.

EXAMPLE 7

In the same manner as set forth in Example 6, 200 mg. tablets are prepared, each containing:

Milligrams
1 - [2 - [(2 - tert.-butylbenzhydryl)oxy]ethyl]hexahydroazepine hydrochloride _____ 25
Milk sugar _____ 132
Starch _____ 33
Magnesium stearate _____ 2
Talc _____ 8

The invention includes within its scope pharmaceutical preparations containing, as the active ingredient, at least one of the benzhydryl ethers of general Formula I, or nontoxic acid-addition or quaternary ammonium salt thereof, in association with a pharmaceutically acceptable carrier. The preparations may take any of the forms customarily employed for administration of therapeutically active substances, but the preferred types are those suitable for oral administration and especially tablets, including sustained release tablets, pills and capsules including the substance. The tablets and pills may be formulated in the usual manner with one or more pharmaceutically acceptable diluents or excipients, for example, lactose or starch, and include materials of a lubricating nature, for example, calcium or magnesium stearate. Capsules made of absorbable material, such as gelatin, may contain the active substance alone or in admixture with a solid or liquid diluent. Liquid preparations may be in the form of suspensions, emulsions, syrups or elixirs of the active substance in water or other liquid medium commonly used for making orally acceptable pharmceutical formulations, such as liquid paraffin, or a syrup or elixir base. The active substance may also be made up in a form suitable for parenteral administration, i.e., as a suspension or emulsion in sterile water or an organic liquid usually employed for injectable preparations, for example, a vegetable oil such as olive oil, or a sterile solution in an organic solvent.

The invention may be variously otherwise embodied within the scope of the appended claims.

What is claimed is:
1. A compound having the formula

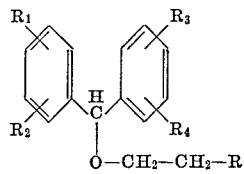

wherein $R_1$, $R_2$, $R_3$ and $R_4$ are the same or different and each represents a hydrogen or lower alkyl; and R is 3-azabicyclo[3,2,2]nonane-3-yl.

2. A compound in accordance with claim 1 having the name 3-[2-(benzhydryloxy)ethyl] - 3 - azabicyclo[3,2,2] nonane.

3. A compound in accordance with claim 1 having the name 3-[2-[(2-methylbenzhydryl)oxy]ethyl] - 3 - azabicyclo[3,2,2]nonane.

4. A compound in accordance with claim 1 having the name 3-[2-[(4-methylbenzhydryl)oxy]ethyl] - 3 - azabicyclo[3,2,2]nonane.

5. A compound in accordance with claim 1 having the name 3-[2-[(2-tert-butylbenzhydryl)oxy]ethyl]-3-azabicyclo[3,2,2]nonane.

6. A compound in accordance with claim 1 having the name 3-[2-[(2,2',6,6'-tetramethylbenzhydryl)oxy] ethyl]-3-azabicyclo[3,2,2]nonane.

References Cited

UNITED STATES PATENTS 2,454,092  11/1948  Rieveschl _____ 260—294.7

OTHER REFERENCES

Idson: Chem. Reviews, vol. 47, pp. 317–320 and 392–399 (1950).

ALTON D. ROLLINS, Primary Examiner

U.S. Cl. X.R.

260—473, 611, 617; 424—244

PO-1050
(5/69)

UNITED STATES PATENT OFFICE
CERTIFICATE OF CORRECTION

Patent No. 3,544,557        Dated December 1, 1970

Inventor(s) Wijbe T. Nauta

It is certified that error appears in the above-identified patent and that said Letters Patent are hereby corrected as shown below:

Column 3, line 20, "as" should read - - or - -. Column 4, li 9, "1[2-" should read - - 1-[2- - -; and on line 12, "C, 72.9 should read - - C, 72.94 - -; and on line 54, "142°" should read - - 143° - -; and the table appearing after line 54 shou appear after the first formula.

Signed and sealed this 30th day of March 1971.

(SEAL)
Attest:

EDWARD M. FLETCHER, JR.        WILLIAM E. SCHUYLER, JR.
Attesting Officer             Commissioner of Patents